T. & W. FLINT.
WEIGHING SCALE.
No. 6,194.  Patented Mar. 20, 1849.
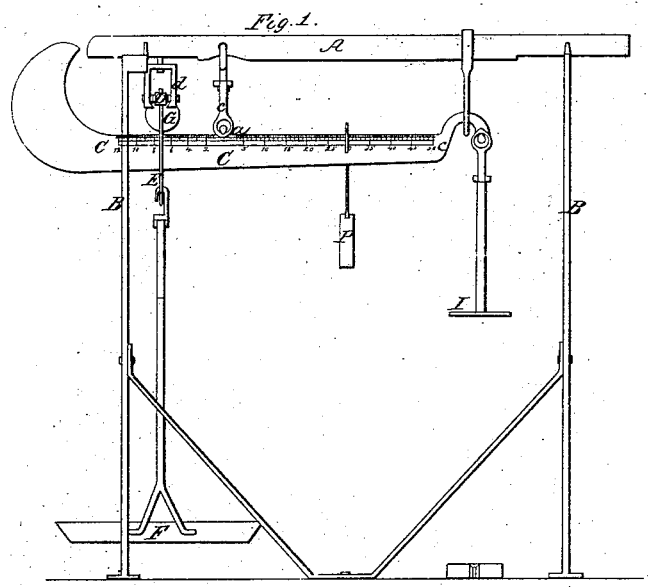
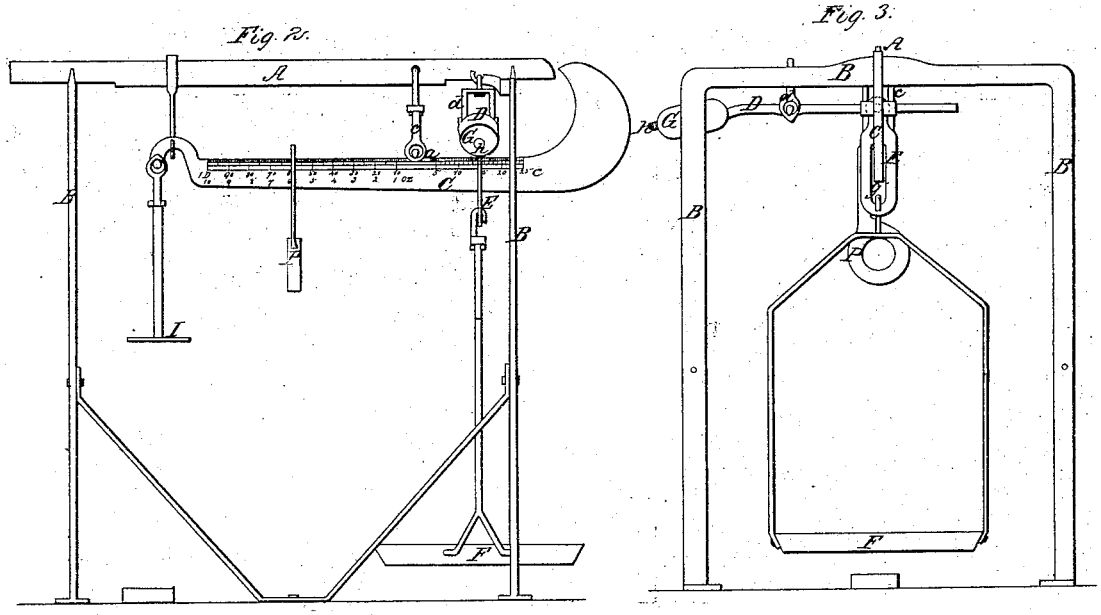

UNITED STATES PATENT OFFICE.

TILLY FLINT, OF WESTFORD, AND WARREN FLINT, OF CHELMSFORD, MASSACHUSETTS.

IMPROVEMENT IN STEELYARDS FOR WEIGHING

Specification forming part of Letters Patent No. 6,194, dated March 20, 1849.

*To all whom it may concern:*

Be it known that we, TILLY FLINT, of Westford, and WARREN FLINT, of Chelmsford, in the county of Middlesex and State of Massachusetts, have invented a new and useful Improvement in the Steelyard-Balance for Weighing; and we do hereby declare that the same is fully described and represented in the following specification and accompanying drawings, letters, figures, and references thereof.

In the said drawings, Figure 1 represents an elevation of one side of our improved steelyard-balance and its supporting-frame. Fig. 2 is an elevation of the opposite side of the same. Fig. 3 is an end elevation of the same.

In the drawings, A denotes a horizontal metallic bar supported on the top of a frame B in such manner as to be capable of being moved or slid forward or backward in a longitudinal direction. It has a steelyard or graduated lever C suspended to it by a stirrup $c$, as seen in the drawings, the fulcra of the said steelyard being seen at $a$ $a$, Figs. 1 and 2. Directly above the said steelyard and at right angles to it and over its short arm, is a lever D, whose fulcrum-journals are made to hang in a stirrup $d$, suspended from the top bar of one side of the frame B. The said lever D carries on one arm a stirrup E, which is suspended from it, receives through its opening $g$ the short arm of the steelyard, and has a scale-pan F depending from its lower end, as seen in the drawings. A poise-weight G is screwed upon a screw $h$, formed on the other arm of the lever D, the said poise-weight being for the purpose of balancing the weight of the scale-pan and its stirrup. On each side of the steelyard-lever there is a scale made on each arm of it, the scales reckoning from the fulcrum each way, as seen in the drawings. One of these scales on each side of the beam—that is, the shortest one thereon—is made to denote the price per pound or any other given denomination of weight of an article of which it may be desirable to ascertain the whole cost. The other scale on the same side and on the long arm of the steelyard is constructed so as to represent the whole cost of the article whatever be its weight, provided the cost of said weight comes within the limits of the scale.

Any article of which, either with or without ascertaining its weight, we desire to know the cost we place in the scale-pan. This being done, we next lay hold of the slide-bar A, and move the same longitudinally until we bring the steelyard into a convenient position to enable us to place the stirrup of the scale-pan directly on that division of the short arm of the steelyard which denotes the price per pound or whatever may be the base or standard of weight.

Having previously placed or hung a movable weight P on the long arm of the steelyard, we move the said weight out on the same until we bring the steelyard into a horizontal position. That division of the scale of the said long arm on which the said weight may then be will denote the gross cost or whole cost of the article in the scale-pan, it being understood that the proportions of the scales on the long and short arms have been previously properly regulated in such manner with respect to the balancing-weight as to cause said weight to so indicate the whole cost.

As the scales of the steelyard are represented in Fig. 1, they enable a person to ascertain the whole cost of any article, provided it does not exceed the sum of fifty cents, for instance, and the price per pound does not exceed twelve cents, for instance. The short scale of the steelyard is about one-half the length of the long one. The said short scale is divided into twelve parts, each of which is numbered and subdivided into eight parts, the same being as seen in the figure. The long scale is divided into one hundred equal parts, numbered as seen in the drawings. Now, if the poise P weighs two pounds, and we place any article in the scale the price of which per pound is six cents, for instance, we next move the steelyard into a proper position to enable us to hang the scale or stirrup thereof on the division indicated by the number 6 of the scale, denoting the price per pound. We next move the poise-weight P on the other scale until the steelyard becomes horizontal. If the poise rests on the division indicated by the number 30, (which would be the sixtieth on the scale,) the price of the whole article would be thirty cents. The opposite side of the steelyard is divided in such manner as to enable us to ascertain the whole price of any article when said price may be less than one dollar, and the price of it per pound is less than twenty-five cents. If, however, we desire to ascertain the whole price of an article whose weight would make the same exceed one dollar and come between one and two dollars, we must apply a suitable weight (that is, such a one as would balance the steelyard to the extent the weight P would when placed at the extreme end or 100 of the scale) on the suspended platform I, hung at the end of the steelyard. This being done, we can employ the poise P to determine the excess of price above one dollar, and between that and two dollars.

The scales and weights of the steelyard may be regulated in various other proportions and ways to produce the above effect, as will be readily understood by balance-makers.

The above-described apparatus will be found especially useful to butchers, who by means of it will be able to readily discover the whole sum to be paid for any piece of meat without rendering it necessary to first ascertain its weight in pounds and fractions of pounds. By hanging the scale-pan on the division 10 of the short arm of the steelyard, Fig. 2, the poise and scale on the same side of the other arm may be used to obtain the weight of any article.

The combination we claim and consider as our invention, consists as follows:

First, the steelyard and scale-pan or any equivalent or equivalents therefor; second, the auxiliary scale on the short arm of the steelyard; third, the movable bar A or its equivalent; fourth, the balancing-lever and stirrup of the scale-pan, the whole being made to operate together by means of weights, substantially in manner and for the purpose as specified.

In testimony whereof we have hereto set our signatures this 13th day of July, A. D. 1848.

TILLY FLINT.
WARREN FLINT.

Witnesses:
ALFRED PROCTER,
E. F. WEBSTER.